(12) United States Patent
Lee et al.

(10) Patent No.: US 8,995,906 B2
(45) Date of Patent: Mar. 31, 2015

(54) M2M EQUIPMENT, BASE STATION, AND METHOD FOR PERFORMING SCHEDULING DELAY

(75) Inventors: Jin Lee, Anyang-si (KR); In Uk Jung, Anyang-si (KR); Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 13/642,444

(22) PCT Filed: Apr. 19, 2011

(86) PCT No.: PCT/KR2011/002790
§ 371 (c)(1),
(2), (4) Date: Oct. 19, 2012

(87) PCT Pub. No.: WO2011/132911
PCT Pub. Date: Oct. 27, 2011

(65) Prior Publication Data
US 2013/0040678 A1      Feb. 14, 2013

Related U.S. Application Data

(60) Provisional application No. 61/325,376, filed on Apr. 19, 2010.

(51) Int. Cl.
*H04W 72/00*   (2009.01)
*H04W 72/12*   (2009.01)

(52) U.S. Cl.
CPC ................... *H04W 72/1252* (2013.01)
USPC .............. 455/39; 455/450; 455/509; 370/329

(58) Field of Classification Search
CPC ................... H04W 72/1252; H04W 72/1205; H04W 72/1284
USPC ................. 455/450–452.2, 509; 370/329
See application file for complete search history.

(56) References Cited

U.S. PATENT DOCUMENTS

| | | | |
|---|---|---|---|
| 2008/0153504 A1* | 6/2008 | Bourlas et al. | 455/452.1 |
| 2009/0054039 A1 | 2/2009 | Van Wijk et al. | |
| 2009/0290509 A1* | 11/2009 | Vujcic et al. | 370/254 |
| 2010/0057485 A1 | 3/2010 | Luft | |
| 2010/0081451 A1 | 4/2010 | Mueck et al. | |
| 2010/0226324 A1* | 9/2010 | Lee et al. | 370/329 |
| 2010/0290415 A1* | 11/2010 | Han et al. | 370/329 |
| 2010/0290420 A1* | 11/2010 | Dalsgaard et al. | 370/329 |
| 2012/0044897 A1* | 2/2012 | Wager et al. | 370/329 |
| 2013/0155986 A1* | 6/2013 | Tiirola et al. | 370/329 |
| 2013/0163549 A1* | 6/2013 | Montojo et al. | 370/329 |

* cited by examiner

*Primary Examiner* — Simon Nguyen
(74) *Attorney, Agent, or Firm* — McKenna Long & Aldridge LLP

(57) ABSTRACT

Disclosed are M2M equipment and base station capable of adjusting load through a scheduling delay. M2M equipment according to the present invention may comprise a receiver which receives a first message including a scheduling delay indicator directing the M2M equipment to delay transmission of uplink data from a base station, and a processor for controlling transmission of the uplink data to be delayed in response to scheduling delay direction of the first message.

10 Claims, 4 Drawing Sheets

M2M EQUIPMENT, BASE STATION, AND METHOD FOR PERFORMING SCHEDULING DELAY

TECHNICAL FIELD

The present invention relates to an M2M device and a base station for performing scheduling delay and a method thereof.

BACKGROUND ART

Machine-to-machine (M2M) communication is communication between electronic devices as its appellation implies. While M2M communication means wired or wireless communication between electronic devices or communication between a human-controlled device and a machine in the broadest sense, these days M2M communication typically refers to wireless communication between electronic devices.

When the concept of M2M communication was introduced in the early 1990s, it was regarded merely as the concept of remote control or telematics and the market therefor was very limited. However, M2M communication has been drastically developed and the M2M communication market has attracted much attention all over the world over the past few years. Especially, M2M communication has a great influence in the fields of fleet management, remote monitoring of machines and facilities, smart metering for automatically measuring the working time of construction equipment and the consumption of heat or electricity, etc. in the Point Of Sales (POS) market and security-related applications. It is expected that M2M communication will find various uses in conjunction with legacy mobile communication, very high-speed wireless Internet or Wireless Fidelity (WiFi), and low-output communication solutions such as ZigBee and thus will extend to Business to Customer (B2C) markets beyond Business to Business (B2B) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

Conventionally, mobile stations are generally individually managed so that one-to-one communication was mainly performed between a base station and a mobile station. Assuming that numerous M2M devices communicate with the base station through one-to-one communication, network overload is expected due to signaling generated between each of the M2M devices and the base station. If M2M communication is rapidly spread and extensively used as described above, an overhead problem may occur due to communication between the M2M devices or between the M2M devices and the base station. Therefore, it is necessary to schedule M2M devices in order to efficiently solve the overhead problem considering characteristics of M2M communication.

DISCLOSURE

Technical Problem

An object of the present invention is to provide a method for, at an M2M device, performing communication with a base station (BS).

Another object of the present invention is to provide a method for, at a BS, performing communication with an M2M device.

Another object of the present invention is to provide an M2M device performing communication with a BS.

Another object of the present invention is to provide a BS performing communication with an M2M device.

Technical Solution

According an aspect of the present invention, a method of performing, at a machine-to-machine (M2M) device, communication with a base station (BS) includes: receiving, from the BS, a first message including a scheduling delay (SD) indicator directing the M2M device to delay transmission of uplink data, wherein the uplink data is delayed instead of being transmitted in accordance with scheduling delay direction of the first message.

The method may further include: receiving, from the BS, a second message including an SD indicator directing the M2M device to transmit uplink data; and transmitting the uplink data in accordance with the uplink data transmission direction. The second message may include information on a resource allocated for transmission of the uplink data, and the uplink data may be transmitted through the allocated resource according to the uplink data transmission direction. A size or index of the allocated resource may correspond to a size or index of a resource allocated to transmit the uplink data that is delayed instead of being transmitted in accordance with the delay direction.

The uplink data transmitted in accordance with the uplink data transmission direction may be uplink data that is delayed instead of being transmitted according to the delay direction. The uplink data transmitted in accordance with the uplink data transmission direction may be new data different from the uplink data that is delayed instead of being transmitted according to the delay direction. A size of the allocated resource may be greater than a size of the resource allocated to transmit the uplink data delayed instead of being transmitted according to the delay direction. The uplink data transmitted in accordance with the uplink data transmission direction may include the uplink data that is delayed instead of being transmitted according to the delay direction and new data different from the delayed uplink data.

According to another aspect of the present invention, a method of performing, at a BS, communication with an M2M device includes: transmitting, to the M2M device, a first message including a scheduling delay (SD) indicator directing the M2M device to delay transmission of uplink data, wherein the uplink data is not received from the M2M device as scheduling delay direction of the first message is transmitted.

The method may further include: transmitting, to the M2M device, a second message including an SD indicator directing the M2M device to transmit uplink data; and receiving the uplink data in accordance with the uplink data transmission direction. The second message may include information on a resource allocated for transmission of the uplink data, and the uplink data may be transmitted through the allocated resource from the M2M device according to the uplink data transmission direction. A size or index of the allocated resource may correspond to a size or index of a resource allocated to transmit the uplink data that is delayed instead of being transmitted in response to the delay direction.

The uplink data transmitted from the M2M device in accordance with the uplink data transmission direction may be uplink data that is delayed instead of being transmitted according to the delay direction. The uplink data transmitted from the M2M device in accordance with the uplink data transmission direction may be new data different from the uplink data that is delayed instead of being transmitted according to the delay direction. A size of the allocated resource may be greater than a size of the resource allocated to transmit the uplink data delayed instead of being transmitted according to the delay direction. The uplink data transmitted from the M2M device in accordance with the uplink data transmission direction may include the uplink data that is delayed instead of being transmitted according to the delay direction and new data different from the delayed uplink data.

According to another aspect of the present invention, an M2M device performing communication with a BS includes: a receiver for receiving, from the BS, a first message including a scheduling delay (SD) indicator directing the M2M device to delay transmission of uplink data; and a processor for controlling the uplink data to be delayed instead of being transmitted in accordance with scheduling delay direction of the first message.

According to another aspect of the present invention, a BS performing communication with an M2M device includes: a transmitter for transmitting, to the M2M device, a first message including a scheduling delay (SD) indicator directing the M2M device to delay transmission of uplink data, wherein the uplink data is not received from the M2M device as scheduling delay direction of the first message is transmitted.

Advantageous Effects

According to the embodiments of the present invention, it is possible to improve communication performance while reducing network congestion by transmitting an indicator for delaying a transmission time of an M2M device that transmits periodic M2M uplink information.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Figure 1:
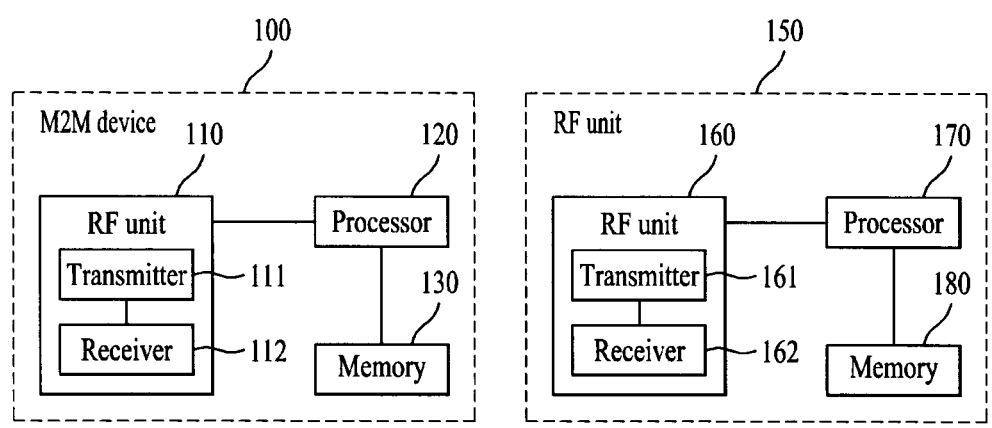
FIG. 1 is a diagram schematically explaining the configuration of an M2M device and a BS according to an exemplary embodiment of the present invention.

FIG. 1 is a diagram schematically explaining the configuration of an M2M device and a BS according to an exemplary embodiment of the present invention.

Referring to FIG. 1, an M2M device 100 (which may be called an M2M communication device) may include a Radio Frequency (RF) unit 110 and a processor 120. A BS 150 may include an RF unit 160 and a processor 170. The M2M device 100 and the BS 150 may selectively include memories 130 and 180, respectively. The RF units 110 and 160 may respectively include transmitters 111 and 161, and receivers 112 and 162. The transmitter 111 and the receiver 112 of the M2M device 100 are configured to transmit and receive signals to and from the BS 150 and other M2M devices. The processor 120 is functionally connected to the transmitter 111 and the receiver 112 so that the processor 120 may control the transmitter 111 and the receiver 112 to exchange signals with other devices. The processor 120 may process signals to be transmitted and transmit the processed signals to the transmitter 111. The processor 120 may process signals received by the receiver 112. If necessary, the processor 120 may store information included in exchanged messages in the memory 130. With such a configuration, the M2M device 100 may perform methods of various embodiments of the present invention which will be described below.

Meanwhile, although not shown in FIG. 1, the M2M device 100 may additionally include a variety of configurations according to an application type thereof. For example, if the M2M device 100 is for smart metering, the M2M device 100 may include an additional configuration for power measurement, and an operation for such power measurement may be controlled by the processor 120 shown in FIG. 1 or an additionally configured processor (not shown).

Although, in FIG. 1, the case in which communication between the M2M device 100 and the BS 150 is performed is shown by way of example, an M2M communication method according to the present invention may be performed between one or more M2M devices, and each device may carry out methods according to various embodiments, which will be described below, with the same configuration as that of the device shown in FIG. 1.

The transmitter 161 and the receiver 162 of the BS 150 are configured to transmit and receive signals to and from other BSs, M2M servers, and M2M devices. The processor 170 is functionally connected to the transmitter 161 and the receiver 162 so that the processor 170 may control the transmitter 161 and the receiver 162 to exchange signals with other devices. The processor 170 may process signals to be transmitted and transmit the processed signals to the transmitter 161. The processor 170 may process signals received by the receiver 162. If necessary, the processor 170 may store information included in exchanged messages in the memory 180. With such a configuration, the BS 150 may perform methods of various embodiments of the present invention which will be described below.

The processors 120 and 170 of the M2M device 110 and the BS 150 direct (e.g. control, adjust, manage, etc.) operations of the M2M device 110 and the BS 150, respectively. The processors 120 and 170 may be respectively connected to the memories 130 and 180 which store program codes and data. The memories 130 and 180 connected respectively to the processors 120 and 170 store operating systems, applications, and general files.

Each of the processors 120 and 170 of the present invention may be called a controller, a microcontroller, a microcomputer, etc. Meanwhile, each of the processors 120 and 170 may be implemented by hardware, firmware, software, or combinations thereof. When the embodiments of the present invention are implemented using hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), or the like, devised to perform the present invention, may be included in the processors 120 and 170.

Meanwhile, when the embodiments of the present invention are implemented using firmware or software, the firmware or software may be configured to include a module, a procedure, or a function which performs the function or operation of the present invention. The firmware or software configured to be able to perform the present invention may be included in the processors 120 and 170 or may be stored in the memories 130 and 180 so as to be executed by the processors 120 and 170.

Devices performing communication according to an M2M scheme (which may be called M2M devices, M2M communication devices, etc.) will increase in number in a given network as machine application types thereof increase. Machine application types under consideration are (1) security; (2) public safety; (3) tracking and tracing; (4) payment; (5) healthcare; (6) remote maintenance and control; (7) metering; (8) consumer devices; (9) fleet management in Point Of Sale (POS)-related and security-related application markets; (10) communication between devices at a vending machine; (11) remote control of machines and facilities and smart metering for automatically measuring the operation time of construction machines and facilities and heat or power consumption; and (12) surveillance video communication, which should not be construed as limiting the present invention. Besides, many other machine application types are being discussed.

As the number of machine application types increases, the number of M2M communication devices can rapidly increase compared to the number of conventional mobile communication devices. Accordingly, individual communications of the M2M communication devices with a BS may generate a severe load in a wireless interface and a network and may result in generation of collision according to scheduling scheme of the BS. To prevent this, in a network including M2M devices scattered therein, a BS or an M2M device can group M2M devices corresponding to the same application type or the same service area into one group according to M2M application type, service area, etc. Such a group can be composed of a representative M2M device and member M2M devices.

A representative M2M device in a group may collect data received by member M2M devices of the group and transmit the collected data to a BS in consideration of a resource overhead, network load, etc. However, the member M2M devices may transmit data to the BS.

M2M devices need to periodically transmit uplink data to the BS in order to provide information on services (e.g., a smart metering report, a healthcare service data report, a tracking information report, etc.) to the BS. While the present invention is described on the assumption that each M2M device periodically transmits a report on a service (or application) executed thereby to the BS, the present invention is not limited to periodic transmission.

To support periodic uplink data transmission of an M2M device, it is necessary to generate an M2M persistent allocation service flow between the M2M device and the BS. In this case, it is desirable to control network congestion by allowing the BS to delay periodic reporting (or data transmission) of the M2M device according to situations including a load status of the BS (or network). Directions of the BS to M2M devices in order to avoid network congestion will now be described.

The present invention proposes a scheduling delay (SD) indicator that is transmitted from a BS to an M2M to avoid network congestion. When the BS wants to delay uplink data transmission of M2M devices due to a current network load status, the BS can transmit the SD indicator (which can also be called an uplink delay indicator) to the M2M devices. As described above, it is assumed that an M2M device is allocated a resource for data transmission through a specific message (e.g., an uplink persistent allocation A-MAP IE message) from the BS.

While the following description is given on the assumption that information on a resource for periodic uplink data transmission of an M2M device and/or an SD indicator are periodically (persistently) transmitted in the form of an uplink persistent allocation A-MAP IE message, the message type and name are not limited to 'uplink persistent allocation A-MAP IE', and any message that can provide information on a resource for periodic uplink data transmission of an M2M device and/or an SD indicator can be used. For example, an SD indicator bit can be included not only in the uplink persistent allocation A-MAP IE message but also in a service specific bandwidth request (BR) header. A service specific scheduling control header may be transmitted by an M2M device or the BS and used to change a service flow parameter. The SD indicator proposed by the present invention may include the following parameter when applied to the service specific scheduling control header.

If (scheduling type=M2M service) {
SD indicator
(0: Grant succeed, 1: Grand deferred)
}

First Embodiment for Traffic Transmission Delay of M2M Device

Figure 2:
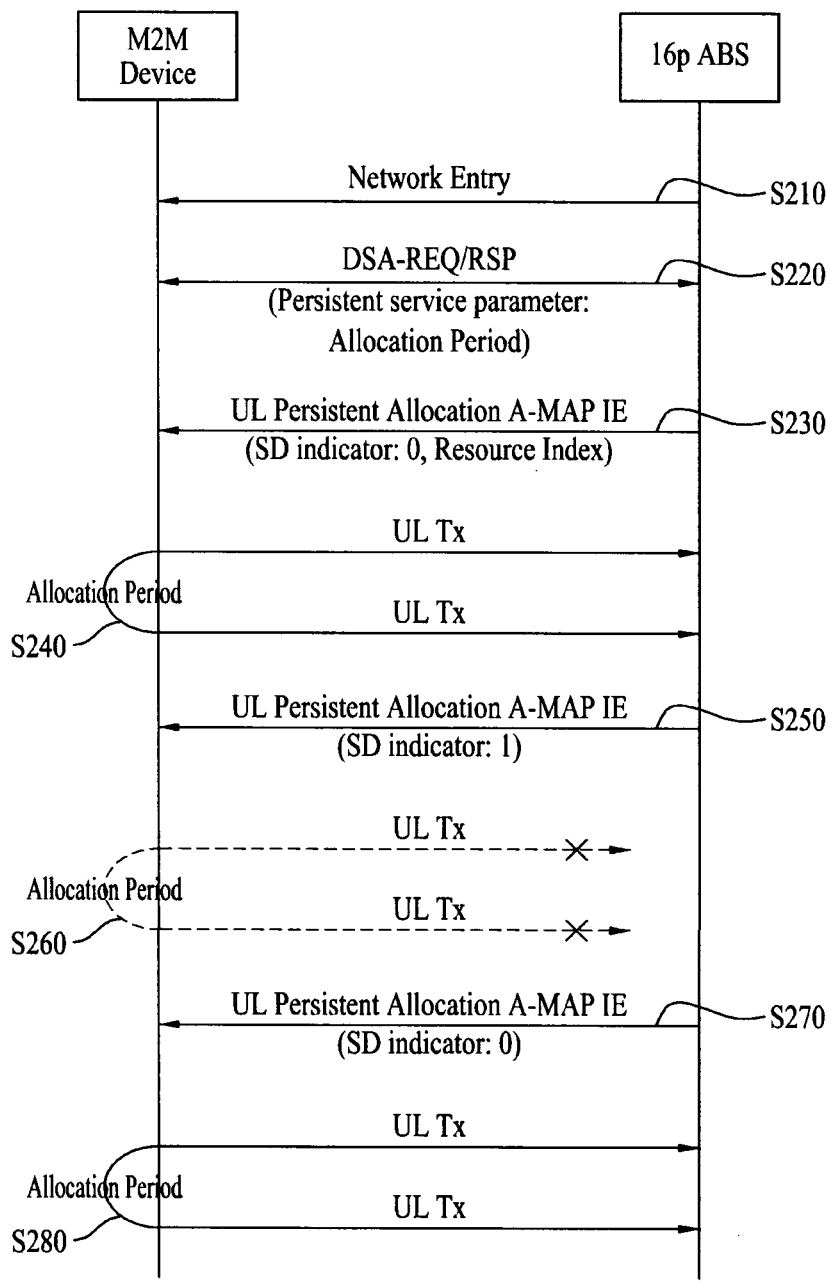
FIG. 2 is a flowchart illustrating a method for delaying persistent M2M traffic transmission using a scheduling delay indicator according to an exemplary embodiment of the present invention.

FIG. 2 is a flowchart illustrating a method for delaying persistent M2M traffic transmission using an SD indicator according to an exemplary embodiment of the present invention.

In FIG. 2, it is assumed that an M2M device generates uplink persistent traffic. The M2M device may be a representative M2M device of a group. The M2M device may perform a network entry procedure for a BS (e.g., a BS of IEEE 802.16p) (S210). Then, the M2M device may generate a persistent service flow through a dynamic service addition (DSA) request/response and negotiate an allocation period with the BS (S220). The M2M device may inform the BS of information on traffic type in step S220. The traffic type may include a first traffic type corresponding to persistent and time-tolerant traffic and a second traffic type corresponding to persistent and time-sensitive traffic. In the method of FIG. 24, it is assumed that the M2M device informs the BS that the traffic type of the M2M device corresponds to the first traffic type.

Upon successful DSA performed between the M2M device and the BS, the BS may transmit information on an initially allocated resource (e.g., an initial resource index) and/or a message (e.g., persistent allocation A-map IE message) including an SD indicator value (e.g., 0 or 1) to the M2M device (S230). For example, the BS can direct the M2M device to delay uplink transmission by setting the SD indicator value to 1 in a specific period. If the traffic of the M2M device that transmits data to the BS at predetermined intervals is time-tolerant, the BS can set the SD indicator value to 1 to direct the M2M device to delay data transmission, thereby reducing network load.

For uplink data transmission, the processor 120 of the M2M device needs to check whether an SD indicator bit received from the BS is enabled. For example, the M2M device waits for an interval in which the next grant is transmitted if the SD indicator value obtained from an SD indicator decoding result is '1', and can transmit data through an uplink resource allocated thereto if the SD indicator value is '0'.

The BS may set the SD indicator value to '1' that directs the M2M device to delay uplink data transmission and transmit the SD indicator value to the M2M device through an uplink persistent allocation A-MAP IE message in the next period (S250). Then, the M2M device can delay uplink data transmission according to the SD indicator value set to '1' (S260). In the next period, the BS may toggle the SD indicator value and signal the SD indicator value set to '0' to the M2M device through an uplink persistent allocation A-MAP IE message (S270). Here, the BS may inform the M2M device of information on a grant size (or allocated resource size) fixed as previously allocated through the uplink persistent allocation A-MAP IE message when transmitting the next grant (S270). Alternatively, the M2M device and the BS may previously agree that the M2M device transmits, through a resource region previously allocated thereto, data that has not been transmitted due to delay when the BS toggles the SD indicator value from '1' to '0' and signals the SD indicator value to the M2M device at data transmission timing of the M2M device. In this case, the BS need not additionally signal information on the allocated resource to the M2M device.

The M2M device may transmit delayed data (SS280) which has not been transmitted since the SD indicator value set to '0' is received in step S260.

Second Embodiment for Traffic Transmission Delay of M2M Device

Figure 3:
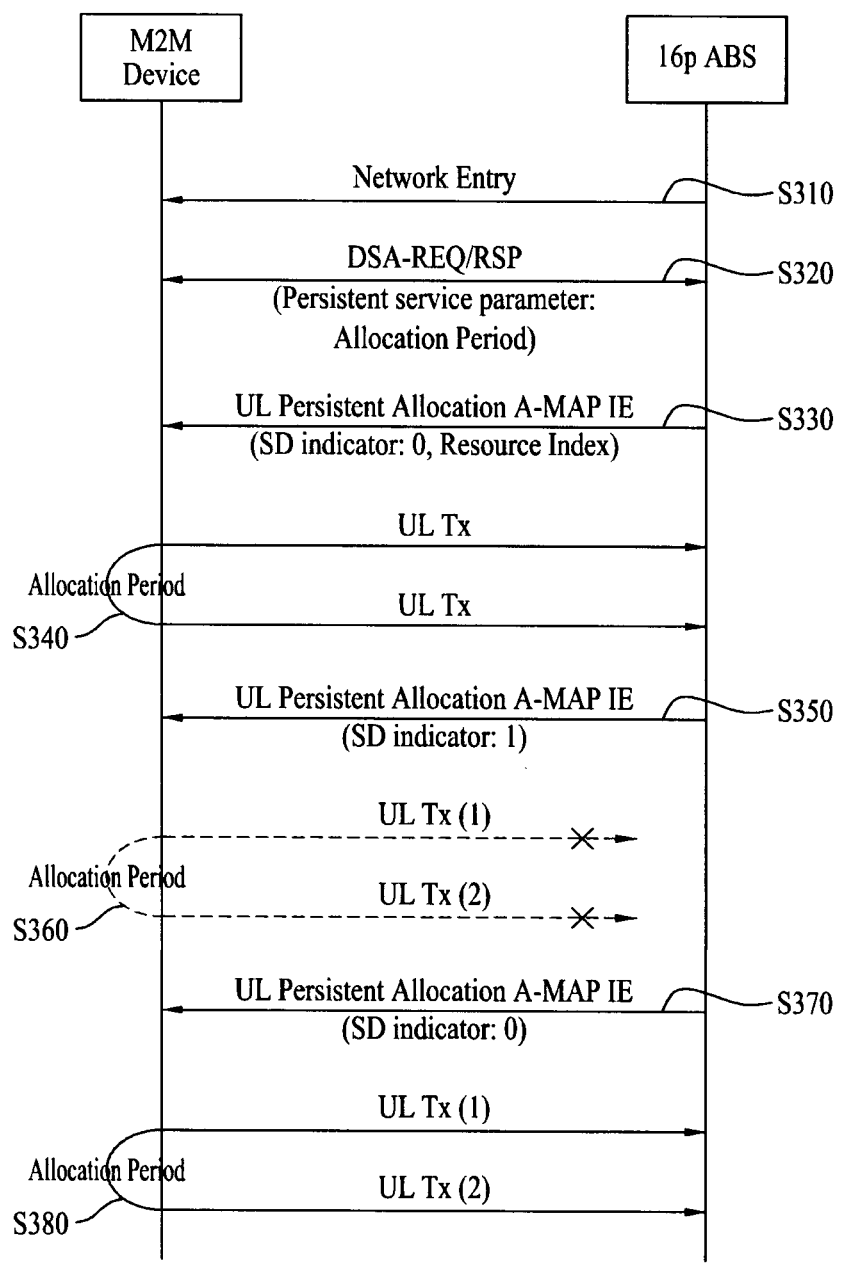
FIG. 3 is a flowchart illustrating a method for delaying persistent M2M traffic transmission using a scheduling delay indicator according to an exemplary embodiment of the present invention.

FIG. 3 is a flowchart illustrating a method for delaying persistent M2M traffic transmission using an SD indicator according to an exemplary embodiment of the present invention.

While steps S310 to S370 shown in FIG. 3 correspond to steps S210 to S270 shown in FIG. 2, the BS may toggle the SD indicator value from '1' to '0' and transmit, to the M2M device, an uplink persistent allocation A-MAP IE message including information (e.g., allocated resource index information) on a resource for uplink data transmission of the M2M device in addition to the SD indicator value in step S370. Alternatively, the M2M device and the BS may previously agree that the M2M device transmits, through a resource region previously allocated thereto, data that has not been transmitted due to delay when the BS toggles the SD indicator value from '1' to '0' and signals the SD indicator value to the M2M device at data transmission timing of the M2M device. In this case, the BS need not signal information on the allocated resource to the M2M device through an additional message.

The resource allocated for uplink data transmission of the M2M device may have the size (i.e., initial fixed packet size) of the resource allocated in steps S330 and S350, as described in the embodiment of FIG. 2. That is, the BS may set the SD indicator value to 1 and signal the SD indicator value to the M2M device at the time when uplink data 1 and uplink data 2 are supposed to be transmitted by the M2M device. Subsequently, the BS may allocate a resource for uplink transmission (data 1) and uplink transmission (data 2), which have not been performed due to delay, in the next grant (S370). Then, the M2M device can discard the delayed data (uplink data 1 and uplink data 2) and transmit new data (e.g., uplink data 3) scheduled to be transmitted at the time (S380).

Third Embodiment for Traffic Transmission Delay of M2M Device

Figure 4:
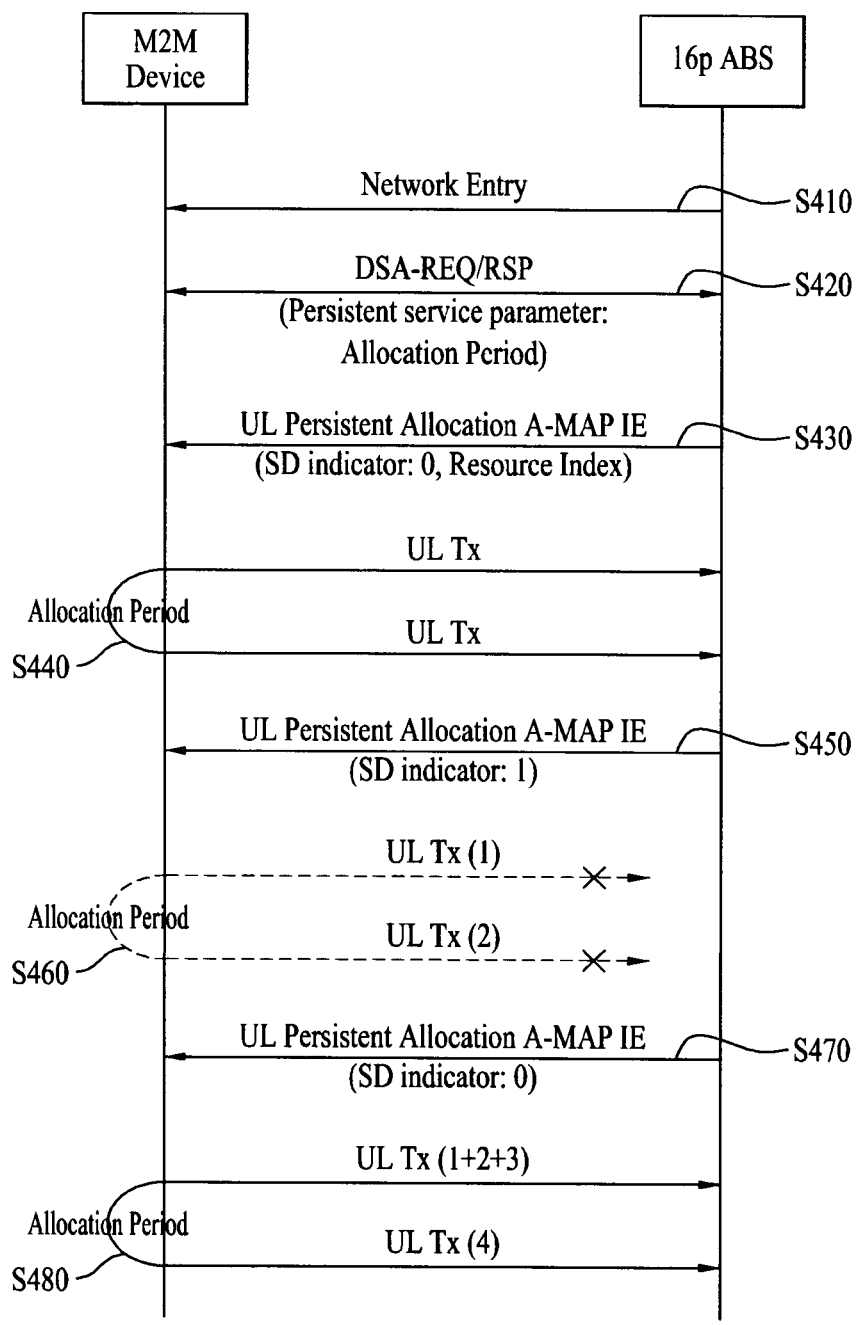
FIG. 4 is a flowchart illustrating a method for delaying persistent M2M traffic transmission using scheduling delay indicator according to an exemplary embodiment of the present invention.

FIG. 4 is a flowchart illustrating a method for delaying persistent M2M traffic transmission using an SD indicator according to an exemplary embodiment of the present invention.

While steps S410 to S470 shown in FIG. 4 correspond to steps S210 to S270 shown in FIG. 2, the BS may toggle the SD indicator value from '1' to '0' and transmit, to the M2M device, an uplink persistent allocation A-MAP IE message including information (e.g., allocated resource index information) on a resource for uplink data transmission of the M2M device in addition to the SD indicator value in step S470. When the BS toggles the SD indicator value from '1' to '0' and signals the toggled SD indicator value to the M2M device, the BS may transmit, to the M2M device, a grant indicating a resource sufficient to transmit data (uplink data 3) newly transmitted by the M2M device and data (uplink data 1 and uplink data 2) that has not been transmitted due to delay in step S450 (S480).

Formats of MAC messages described in the above-mentioned first to third embodiments will now be explained.

First MAC Message Format

The BS and the M2M device may negotiate parameters shown in the following table 1 through an AAI-REG-REQ/RSP or AAI-SBC-REQ/RSP message (i.e., in steps S210, S310 and S410) during a capability negotiation procedure. Table 1 shows AAI-REG-REQ/RSP message format or AAI-SBC-REQ/RSP message format.

The BS may transmit a AAI-REG-REQ/RSP or AAI-SBC-REQ/RSP message including a persistent allocation resource field indicating whether persistent (or periodic) resource allocation is supported and a scheduling flexibility field indicating whether flexibility of a grant size (or allocated resource size) allocated for the M2M device by the BS after the SD indicator bit is toggled (e.g., after an indicator value directing data transmission delay is changed to an indicator value directing data transmission) is supported. The M2M device and the BS may negotiate whether to support persistent resource allocation and scheduling flexibility through the AAI-REG-REQ/RSP or AAI-SBC-REQ/RSP message. In addition, the BS may inform the M2M device whether to perform the procedure of the first embodiment, the procedure of the second embodiment or the procedure of the third embodiment in advance.

TABLE 1

| Attributes | Size (bits) | Value | Condition |
|---|---|---|---|
| Array of attributes | | | |
| Persistent allocation support | 1 | If Bit#0 = 1, it supports | |
| Scheduling Flexibility | 1 | If bit #0 = 1, the size of resource for persistent traffic is incremented after SD indicator is toggled. If bit #0 = 0, the size of resource for persistent traffic is kept as the original size even after SD indicator is toggled. | This applies for ABS to allocate persistent resource when 'SD' indicator is switched from 1 to 0 |

Referring to Table 1, the BS may transmit a 1-bit indicator indicating whether persistent allocation is supported to the M2M device through the AAI-REG-REQ/RSP or AAI-SBC-REQ/RSP message. When the SD indicator value is toggled to '0' from '1', the scheduling flexibility field can be applied if the BS performs persistent resource allocation. Accordingly, the BS can transmit the scheduling flexibility field indicating whether the size of a resource for persistent traffic is kept as a previously allocated resource size or increased after the SD indicator is toggled (after indication of scheduling delay is changed to indication of data transmission) through the AAI-REG-REQ/RSP or AAI-SBC-REQ/RSP message.

Second MAC Message Format

The M2M device and the BS may negotiate parameters (M2M QoS parameters) shown in the following table 2 during a DAS procedure. That is, the M2M device can negotiate whether uplink transmission data is persistent or not and time-tolerant or time-sensitive with the BS through the AAI-DSA-REQ/RSP message (i.e., in steps S220, S320 and S430). In case of persistent traffic, the M2M device can negotiate an allocation period with the BS.

TABLE 2

| Attributes | | Size (bits) | Value/Note | condition |
|---|---|---|---|---|
| Array of attributes | | | | |
| QoS parameters | M2M device UL Transmission parameter | 8 | Bit0: Persistent Bit1: Time tolerant Bit2: Time sensitive Bit3~Bit 7: Reserved | |
| | Allocation period | 2 | The number of subframe waiting for uplink transmission | Present when bit0 is set in 'MeM device Transmission parameter |

The format of the uplink persistent allocation A-MAP IE message described in the above first to third embodiments will be explained in detail.

TABLE 3

| Syntax | Size (bit) | Description/Notes |
|---|---|---|
| M2M_UL Persistent A-MAP_IE { | | |
| SD indicator | 1 | 0: Allocation succeed 1: Allocation defer |
| Scheduling Flexibility (omitted when negotiated during entry) | 1 | If bit#0 = 1, the size of resource for persistent traffic is incremented after SD indicator is toggled. If bit#0 = 0, the size of a resource for persistent traffic is kept as the original size after SD indicator is toggled. |
| Allocation period (set as negotiated during DSA procedure) If (Allocation period)!=00 | 2 | 00: de-allocation 01: xx ms 10: yy ms 11: zz ms |
| Resource index | | Grant size depends on scheduling flexibility value. |
| ................. | | |

Referring to Table 3, the uplink persistent allocation A-MAP IE message may include a 1-bit SD indicator field and a 1-bit scheduling flexibility field. The scheduling flexibility field can indicate whether the size of a resource for persistent traffic is kept as the original size (e.g., a bit value '0') or increased (e.g., to a bit value '1') for delayed data and newly transmitted data. If the M2M device and the BS negotiate the scheduling flexibility during network entry, the scheduling flexibility field can be omitted. An allocation period field may be set as negotiated in the DSA procedure. A resource index field includes information on a grant size negotiated in the scheduling flexibility field or the network entry procedure.

TABLE 4

| Syntax | Size (bit) | Description/Notes |
|---|---|---|
| M2M_UL Persistent A-MAP_IE { | | |
| SD indicator | 1 | 0: Allocation succeed 1: Allocation defer |
| If (SD indicator ==0){ Additional resource indicator | 1 | This indicates whether additional resource is included. |
| If(Additional resource indicator==1){ Additional resource index | 7 | This indicates the size of resource added to transmit packet that has not been transmitted. |
| } | | |
| } | | |
| ......... | | |

Table 4 shows another exemplary uplink persistent allocation A-MAP IE message format. When the SD indicator is '0' (i.e., no scheduling defer), the BS can inform the M2M device as to whether an additional resource is included through an additional resource indicator field. When the additional resource indicator is '1', this indicates that there is an additional resource. An additional resource index field in a predetermined bit (e.g., 7 bits) can indicate the size of a resource added to transmit data (packet) that has not been transmitted. In this manner, the additional resource can be used by being combined with the resource index field. The size of a total resource allocated at the corresponding time is indicated by the resource index and additional resource index and resources continuously allocated from the next period are indicated only using the resource index.

Periodic uplink coordinated paging will now be described.

An M2M device that periodically transmits uplink data can operate in an idle mode in almost all life time thereof except data transmission time. Accordingly, the M2M device can negotiate a paging cycle corresponding to a data transmission cycle with the BS when entering the idle mode and the BS can transmit a paging message to the M2M device in each paging cycle. Such a paging scheme performed in such a manner that the BS polls the M2M device is called coordinated paging. According to the present invention, the BS can transmit the SD indicator through a coordinated paging message and direct M2M devices to defer data transmission in order to reduce network congestion due to load status.

The following table 5 shows an exemplary paging message format.

TABLE 5

| Syntax | Size (bit) | Description/Notes |
| --- | --- | --- |
| Action code | 2 | Used to indicate the purpose of the AAI-PAG-ADV message0b00: perform network reentry0b01: perform ranging for location update0b10: coordinated paging to poll the M2M device for UL data transmission0b11: coordinated paging to poll the M2M device for UL data transmission, and to signal the DL data pending0bxx: UL transmission defer |
| If Action code ==0bxx |  | Start time of uplink forbidden time, Uplink forbidden time |

Referring to FIG. 5, the BS may transmit the paging message including an action code field to the M2M device. The action code field indicates the purpose of the paging message. For example, the action code field indicates that the purpose of the paging message is to perform network reentry when '0b00', indicates that the purpose of the paging message is to perform ranging for location update when '0b01', indicates that the purpose of the paging message is coordinated paging to poll the M2M device for uplink data transmission when '0b10', and indicates that the purpose of the paging message is to perform coordinated paging to poll the M2M device for uplink data transmission and to signal downlink data pending when '0b11'. In this manner, it is possible to add an option for delaying transmission according to the state of the BS through the 'uplink transmission delay' parameter even in the case of periodic transmission.

Provided that the coordinated paging message format shown in FIG. 5 includes the SD indicator directing uplink transmission delay, the BS may transmit information on for how long uplink transmission delay is applied (uplink forbidden time) to the M2M device. Optionally, the BS may additionally include information on start time of the uplink forbidden time in the coordinated paging message and transmit the coordinated paging message. If the information on the start time of the uplink forbidden time is not present, the M2M device can apply uplink transmission delay for the uplink forbidden time from the time (e.g., frame) when the coordinated paging message is received.

As described above, it is possible to improve communication performance while reducing network congestion by transmitting an indicator for delaying transmission time of an M2M device that periodically transmits M2M uplink information to the M2M device.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The M2M device and BS capable of adjusting a load state through scheduling delay are applicable to various communication systems such as IEEE 802.16.

The invention claimed is:

1. A method of performing, at a machine-to-machine (M2M) device, communication with a base station (BS), the method comprising:
receiving, from the base station (BS), a first message including scheduling flexibility information, the scheduling flexibility information indicates a resource size for transmission of uplink data, and it is incremented after a scheduling delay (SD) indicator is toggled;
receiving, from the BS, a second message including the SD indicator instructing the M2M device to delay transmission of uplink data and information related to an allocated resource;
delaying the transmission of uplink data based on the second message;
receiving, from the BS, a third message including the toggled SD indicator and information related to an additional allocated resource, the toggled SD indicator instructing the M2M device transmits uplink data; and
transmitting, to the BS, delayed uplink data and new uplink data using the allocated resource and the additional allocated resource based on the scheduling flexibility information and the third message.

2. The method according to claim 1, wherein the first message is received during a basic capability negotiation procedure between the M2M device and the BS.

3. The method according to claim 1, wherein the information related to an allocated resource includes a size or index of the allocated resource, and the information related to the additional allocated resource includes a size or index of the additional allocated resource a resource.

4. The method according to claim 1, wherein the second message or the third message includes an uplink persistent control message for the M2M device.

5. A method of performing, at a base station (BS), communication with a machine-to-machine M2M device, the method comprising:

transmitting, to the M2M device, a first message including scheduling flexibility information, the scheduling flexibility information indicates a resource size for transmission of uplink data and, it is incremented after a scheduling delay (SD) indicator is toggled;

transmitting, to the M2M device, a second message including the SD indicator instructing the M2M device to delay transmission of uplink data and information related to an allocated resource, transmitting, to the M2M device, a third message including the toggled SD indicator and information related to an additional allocated resource, the toggled SD indicator instructing the M2M device transmits uplink data; and receiving, from the BS, delayed uplink data and new uplink data using the allocated resource and the additional allocated resource based on the scheduling flexibility information and the third message.

6. The method according to claim 5, wherein the first message is received during a basic capability negotiation procedure between the M2M device and the BS.

7. The method according to claim 5, wherein the information related to an allocated resource includes a size or index of the allocated resource, and the information related to the additional allocated resource includes a size or index of the additional allocated resource.

8. The method according to claim 5, wherein the second message or the third message includes an uplink persistent control message for the M2M device.

9. A machine-to-machine M2M device performing communication with a BS, the M2M device comprising:

a receiver configured to:

receive, from a base station (BS), a first message including scheduling flexibility information, the scheduling flexibility information indicates a resource size for transmission of uplink data, and it is incremented after a scheduling delay (SD) indicator is toggled;

receive, from the BS, a second message including the SD indicator instructing the M2M device to delay transmission of uplink data and information related to an allocated resource; and a processor configured to delay the transmission of uplink data based on the second message, wherein the receiver is further configured to receive, from the BS, a third message including the toggled SD indicator and information related to an additional allocated resource, the toggled SD indicator instructing the M2M device transmits uplink data; and a transmitter configured to transmit, to the BS, delayed uplink data and new uplink data using the allocated resource and the additional allocated resource based on the scheduling flexibility information and the third message.

10. A base station BS for performing communication with a machine-to-machine M2M device, the BS comprising:

a transmitter configured to:

transmit, to the M2M device, a first message including scheduling flexibility information, the scheduling flexibility information indicates a resource size for transmission of uplink data, and it is incremented after a scheduling delay (SD) indicator is toggled;

transmit, to the M2M device, a second message including the SD indicator instructing the M2M device to delay transmission of uplink data;

transmit, to the M2M device, a third message including the toggled SD indicator and information related to an additional allocated resource, the toggled SD indicator instructing the M2M device transmits uplink data; and a receiver configured to receive, from the BS, delayed uplink data and new uplink data using the allocated resource and the additional allocated resource based on the scheduling flexibility information and the third message.

* * * * *